Sept. 10, 1963 P. L. WILLIAMS 3,103,253
MOTION DETECTOR
Filed July 24, 1959 3 Sheets-Sheet 1
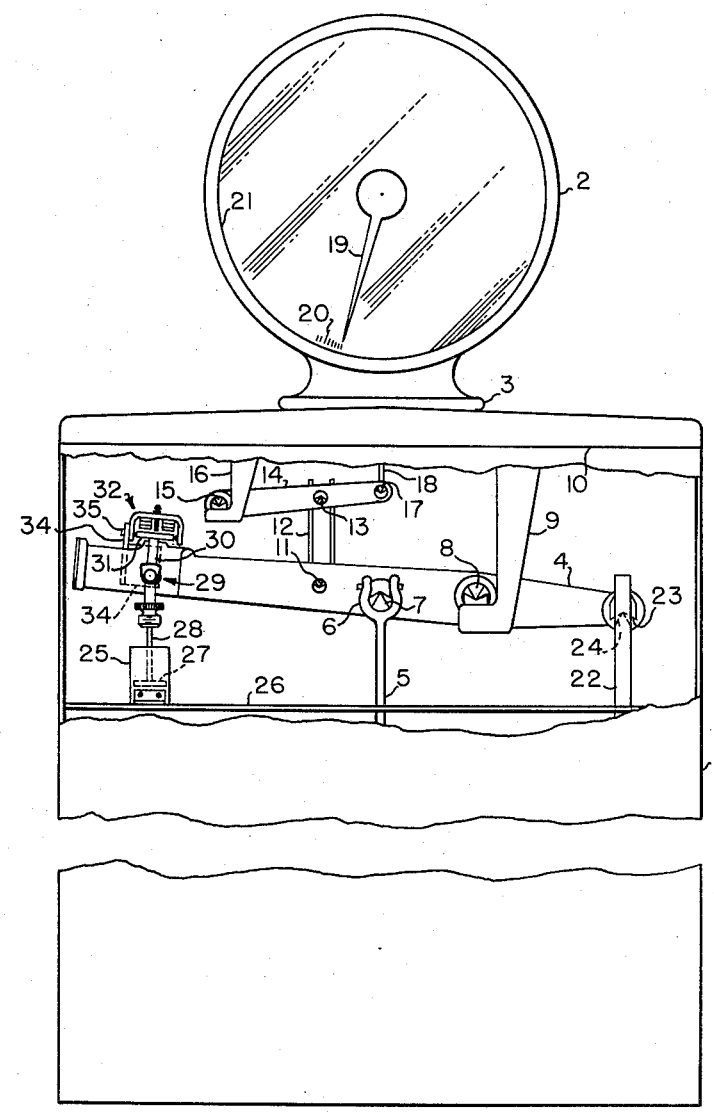
Fig. I
INVENTOR.
PAUL L. WILLIAMS
BY
Marshall, Marshall & Yeasting
ATTORNEYS Sept. 10, 1963  P. L. WILLIAMS  3,103,253
MOTION DETECTOR
Filed July 24, 1959  3 Sheets-Sheet 2
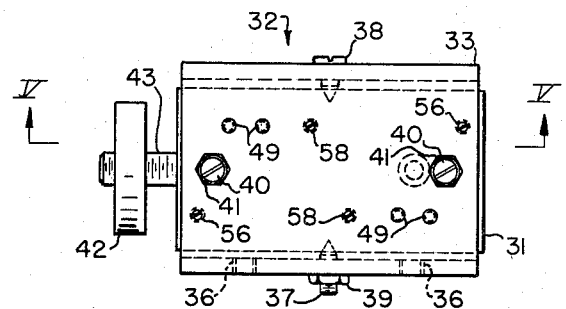
Fig. II
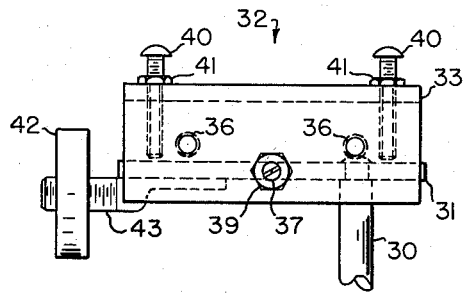
Fig. III
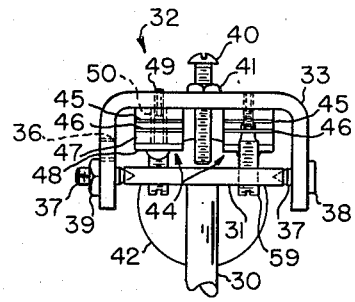
Fig. IV
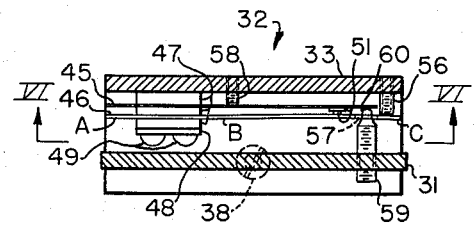
Fig. V
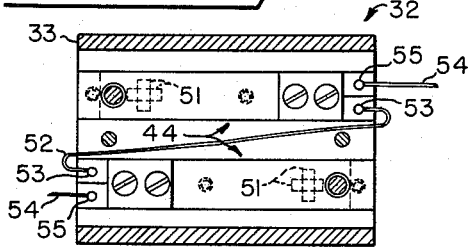
Fig. VI
INVENTOR.
PAUL L. WILLIAMS
BY
Marshall, Marshall & Yeasting
ATTORNEYS

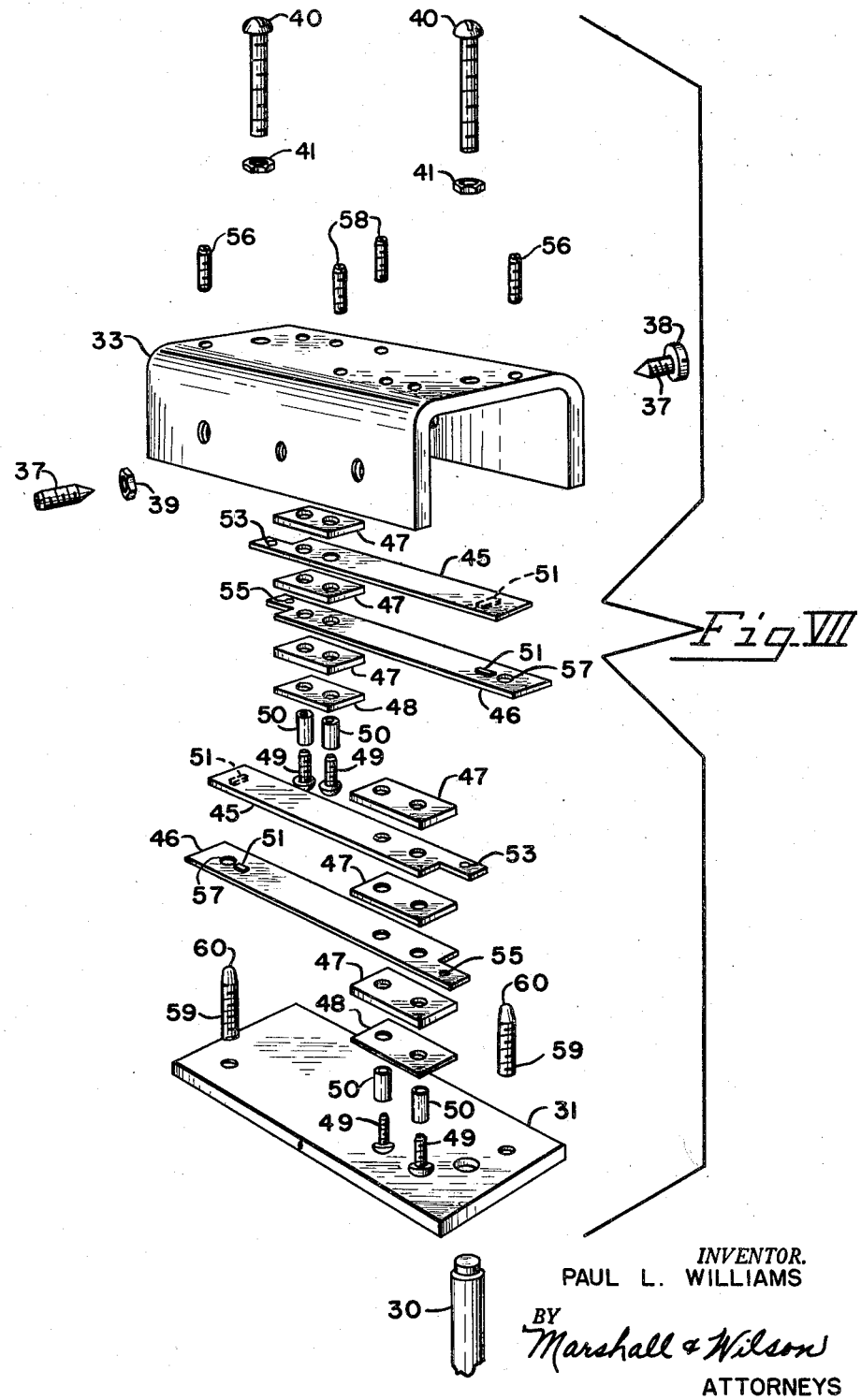

United States Patent Office 3,103,253
Patented Sept. 10, 1963

3,103,253
MOTION DETECTOR
Paul L. Williams, near Toledo, Ohio, assignor to Toledo Scale Corporation, Toledo, Ohio, a corporation of Ohio
Filed July 24, 1959, Ser. No. 829,398
6 Claims. (Cl. 177—187)

This invention relates generally to measuring instruments such as weighing scales, and more particularly to improvements in mechanical motion detector assemblies which detect motions in measuring instruments.

The mechanical motion detector assembly, when utilized to detect weighing scale motions, like the contactor device which is shown and described in U.S. Patent No. 2,333,982, issued on Nov. 9, 1943 to R. F. Brown, is associated with delay means for preventing the printing or recording of weighing scale data until a preset time has elapsed after the scale has come to rest, the rest condition being detected by the mechanical motion detector assembly. Such delay means, for example, can be a motorized timer or a time delay relay which is in electrical circuit with the mechanical motion detector. The circuit to the motorized timer or to the time delay relay is closed by means of the mechanical motion detector assembly when the scale is at rest. After the preset time has elapsed, the motorized timer or the time delay relay completes a circuit to a recording mechanism and printing or recording of weighing scale data may take place. Hence, premature operation of the recording mechanism is prevented.

Prior mechanical motion detectors are generally unsatisfactory. Many require special dashpots for their operation; this increases the number of dashpots per measuring instrument from one to two. Nearly all of the prior mechanical motion detectors are vibration sensitive and are difficult to adjust. All of the prior mechanical motion detectors have relatively long distances to travel for the operation of their contacts; this, for example, adversely affects the weighing in those cases in which the motion detectors are operated by means of dashpots in weighing scales because the dashpots do not provide their usual damping during movements to operate the contacts.

It is, accordingly, the principal object of this invention to provide an improved motion detector for detecting measuring instrument motions.

Another object of the invention is to provide a rugged, reliable, vibration insensitive, and easily adjustable mechanical motion detector.

Still another object of the invention is to provide an improved motion detector which is capable of being driven or operated by the usual weighing scale dashpot and which does not require an additional dashpot to be incorporated in the scale for its operation.

A further object of the invention is to provide a mechanical motion detector having electrical contacts which are opened and closed with little travel to detect motions in a measuring instrument.

More specific objects and advantages are apparent from the following description of a specific embodiment of the invention.

According to the invention, the mechanical motion detector includes a pair of contacts and is attached to a condition responsive member such as a dashpot plunger in a measuring instrument such as a weighing scale. Instrument motion is detected by sensing motion of the dashpot plunger. The contacts are of a spring type and are wired in series. By means of a pivot arrangement within the motion detector, one contact is held open while the dashpot plunger moves up and the other contact is held open while the plunger moves down. The result is an open circuit during instrument motion and a closed circuit when the instrument is at rest. The contacts are opened from normally closed positions against fixed stops that are adjustable with fine precision to give a shorter contact travel than any known contactor. This is important because it permits the dashpot to operate nearly normally so that the measuring is not affected. In the case of a weighing scale, no "free" or undamped zone can be seen at the scale dial.

The invention may be more readily understood from the following detailed description of a specific embodiment in which description reference is made to the accompanying drawings.

In the drawings:

FIG. I is a front elevational view of a cabinet and a dial housing of a weighing scale embodying the motion detector of the invention, parts of the cabinet being broken away;

FIG. II is an enlarged plan view of the motion detector which is illustrated in FIG. I;

FIG. III is a side elevational view of the motion detector which is illustrated in FIG. II;

FIG. IV is an end elevational view of the motion detector which is illustrated in FIG. II;

FIG. V is a sectional view taken along the line V—V of FIG. II;

FIG. VI is a sectional view taken along the line VI—VI of FIG. V; and

FIG. VII is an enlarged, exploded, perspective view of the motion detector.

These specific drawings and the accompanying description are intended merely to illustrate the invention but not to limit its scope.

A weighing scale embodying the mechanical motion detector of the invention includes a cabinet 1 surmounted by a dial housing 2 erected on a housing base 3. A load receiving mechanism (not shown) is provided which includes the usual load supporting levers and load receiving platform. The load moment is transmitted to a tare beam lever 4 through a suitable stirrup on the nose of the load supporting levers through a rod 5 suspended by means of a stirrup 6 from laterally extending pivots 7 in the tare beam lever 4, which lever, by means of fulcrum pivots 8, is rockably mounted upon a fulcrum stand 9 fixedly hung from a ceiling 10 in the interior of the cabinet 1. The cabinet 1 is usually located adjacent the load receiving platform in a position such that the depending rod 5 is vertically positioned to engage the aforementioned stirrup in the nose of the load supporting lever system.

Load forces to be counterbalanced are transmitted from the tare beam lever 4 through a power pivot 11 and connecting linkage 12 to a load pivot 13 of a second lever 14, which, by means of fulcrum pivots 15, is rockably mounted upon a fulcrum member 16 fixedly hung from the ceiling 10 of the cabinet 1. The second lever 14 has a power pivot 17 engaging a bearing at the lower end of a rod 18 that extends upwardly into the dial housing 2 and is connected to automatic load counterbalancing mechanism enclosed within the dial housing. An indicator 19 cooperates with a series of indicia 20 marked on the exposed face of a chart 21 to indicate the weights of loads. Plates 22, whose upper ends are provided with V-bearings 23 which are supported upon laterally extending pivots 24 in the tare beam lever 4 on the opposite side of the fulcrum point of the tare beam lever 4 from the connection between the rod 5 and the tare beam lever, function to carry a weight, as shown and described in U.S. Patent No. 2,864,606 issued on Dec. 16, 1958 to R. O. Bradley and C. H. Maurice, Jr., for counterbalancing the dead weight of the load receiving platform and the lever system not counterbalanced by the load counterbalancing mechanism when in initial position.

A dashpot 25, secured to a shelf 26 within the cabinet 1, has its plunger 27 connected through a stem 28, a ball and socket connection 29 and a connecting member 30 to an actuating lever 31 of the mechanical motion detector 32 of the invention which is carried by the left hand end of the tare beam lever 4 as viewed in FIG. I. A similar dashpot ball and socket connection is shown in more detail in U.S. Patent No. 2,503,697 issued on April 11, 1950 to M. A. Weckerly. The dashpot 25, which is operatively connected to the tare beam lever 4 through the motion detector 32, serves to suppress continued oscillation of the indicator 19 following sudden changes in load. The plunger 27 is to be considered as an example of a condition responsive member which is mounted for movement in response to conditions being measured by a measuring instrument and whose motion is sensed by the motion detector 32 in order to detect motion of the measuring instrument.

The mechanical motion detector 32, which is operatively connected to the plunger 27 of the dashpot 25, detects scale motion by sensing the motion of the plunger; the motion detector 32 includes an inverted, flat-bottomed, U-shaped bracket 33 which is secured to a mounting bracket 34 (FIG. I), fixedly attached to the tare beam lever 4, by means of a pair of screws 35 one of which is shown in FIG. I. Holes 36 (FIGS. II–IV) in the U-shaped bracket 33 receive the screws 35. The actuating lever 31 of the motion detector 32 is pivotally mounted in the U-shaped bracket 33 on the cone tips of a pair of screws 37. The right hand one of the screws 37 as viewed in FIG. IV has a head 38 and it is threaded into the bracket 33 to its shoulder. The left hand one of the screws 37 is an adjusting screw and it is advanced to a point that allows free oscillation of the lever 31 and yet maintains a minimum amount of play between the cone tips of the screws and their bearing seats in the lever. A lock nut 39 holds the adjusting screw 37 in adjusted position.

The actuating lever 31 is maintained in a position substantially parallel to the top side of the bracket 33 by means of a pair of stop screws 40 one on either side of the fulcrum axis of the lever. Lock nuts 41 hold the screws 40 in adjusted positions. The stop screws 40 are adjusted to allow the lever 31 to travel through only a very small distance relative to the tare beam lever 4 which is small enough that when reflected to the scale dial it represents less than one graduation. Therefore, no "free" or undamped zone can be seen at the dial. That is, the dashpot 25 is connected to the tare beam lever 4 through the motion detector 32 and functions to suppress continued oscillation of the indicator 19 following sudden changes in load only when the lever 31 is against one or the other of the stop screws 40. Practically no dashpot damping occurs during movement of the lever 31 between the stop screws 40. However, since the stop screws 40 are adjusted to allow the lever 31 to travel relative to the tare beam lever 4 through only a very small distance, the dashpot 25 operates nearly normally. The stop screws 40 are adjusted to allow such a short travel on the lever 31 relative to the tare beam lever 4 that when loads are placed upon the scale no undamped oscillations can be seen at the dial.

The connecting member 30 which serves to connect the stem 28 of the dashpot 25 to the lever 31 is connected to the lever 31 at one side of the fulcrum axis of the lever 31 as shown in FIG. III. A counterweight 42, adjustably positioned on a threaded stud 43, which is secured to the lever 31 at the other side of the lever's fulcrum axis, balances the weight of the plunger 27, stem 28, ball and socket connection 29, and connecting member 30, i.e., the dashpot plunger assembly. When a load is applied to or removed from the scale, the tare beam lever 4 pivots about its fulcrum pivots 8. This causes the motion detector 32 carried by the lever 4 to move in an arc about the pivots 8 and the dashpot plunger 27 connected to the motion detector to move vertically. The damping force of the dashpot 25 tends to resist this motion and causes the actuating lever 31 of the motion detector 32 to pivot about the axes of cone pointed screws 37 and relative to the tare beam lever 4. Depending upon the direction of rotation of the tare beam lever 4, the actuating lever 31 will be pivoted against one or the other of the stop screws 40. While the lever 31 contacts either one of the stop screws 40, the dashpot 25 functions in its usual manner. While the lever 31 is moving between the stop screws 40, practically no dashpot damping occurs.

The motion detector 32 also includes two spring type contact assemblies 44. These assemblies 44 are identical except for their orientation. Each assembly 44 comprises an upper leaf spring 45 and a lower leaf spring 46 each made of electrically conductive material, three spacers 47 made of electrically insulating material, one of the spacers 47 being between the leaf springs, one of the spacers 47 being above the upper leaf spring 45 and one of the spacers 47 being below the lower leaf spring 46, a plate 48 contacting the lower one of the spacers 47 and a pair of screws 49 which secure the parts of the assembly 44 in a stack to the bracket 33. Each of the screws 49 is provided with an insulating sleeve 50. The leaf springs 45 and 46 are each provided near their free ends with a contact 51, the contacts being juxtaposed. As best shown in FIG. VI, the assemblies 44 are located in the bracket 33 side by side, but in reverse orientation, i.e., the juxtaposed contacts 51 of one of the assemblies 44 are on one side of the fulcrum axis of the actuating lever 31 and the juxtaposed contacts 51 of the other one of the assemblies 44 are on the other side of the fulcrum axis of the actuating lever 31. A conductor 52 connects terminals 53 one on each of the upper leaf springs 45 to wire the contacts 51 in series. Conductors 54 are connected to terminals 55 on the lower leaf springs 46 and serve to connect the contacts 51 to the device to be controlled. The conductors 52 and 54 are shown in FIG. VI only and are omitted from the rest of the figures for clarity of illustration.

The lower leaf springs 46 are identical; each before it is installed in its assembly 44 is so bent at B (FIG. V) that, when it is first installed, it extends from B to C at an angle toward the top of the bracket 33 while from A to B it is parallel to the top of the bracket 33. The leaf spring 46 is straightened out as shown in FIG. V by means of a screw 56. This arrangement maintains the contacts 51 on the lower springs 46 in adjustable positions which are retained even though the motion detector 32 is subjected to vibration. There is a hole 57 in each of the lower leaf springs 46 adjacent the screws 56.

The upper leaf springs 45 are made of thinner material than are the lower leaf springs 46 and are quite flexible. As shown in FIGS. V and VI, the upper leaf springs are not as long as the lower leaf springs; this makes room for the screws 56 which extend from the top of the bracket 33 past the free ends of the upper leaf springs and against the free ends of the lower leaf springs. The contacts 51 on the upper leaf springs 45 are urged toward the contacts 51 on the lower leaf springs 46 by means of a pair of screws 58 which are threaded through the top of the bracket 33 and one of which bears against one of the upper leaf springs and the other one of which bears against the other one of the upper leaf springs. Contacts 51 normally are closed. The contact force is adjustable by turning screws 58.

The actuating lever 31 carries a plunger or contact operator 59 at each of its ends in alignment with the holes 57 in each of the lower leaf springs 46. The plungers 59 are threaded through the lever 31 in order to be adjustable and are provided with rounded tips 60 which extend through the holes 57 in the lower leaf springs 46 without touching the lower leaf springs and which touch the under surfaces of the upper leaf springs 45. By means of the pivotal lever 31 one set of contacts 51 is held open by one of the plungers 59 while the dashpot plunger 27 moves up and the other set of contacts 51 is held open by the other one of the plungers 59 while the dashpot plunger 27 moves down. Screws 56 and 58 and plungers 59 are insulated tipped screws and plungers, such as glass tipped screws and plungers. The result is an open circuit during scale motion and a closed circuit when the scale is at rest. The contacts 51 are opened from normally closed positions against fixed stops that are adjustable with fine precision to give a shorter contact travel than any known contactor. This is important because it permits the dashpot 25 to operate nearly normally so that the weighing is not affected. No "free" or undamped zone can be seen at the scale dial. There is thus provided a rugged, reliable, vibration insensitive, and easily adjustable mechanical motion detector which may be operatively connected to the usual dashpot in a weighing scale and which has electrical contacts which are opened and closed with little travel.

In operation, whenever the tare beam lever 4 comes to rest the damping force of the dashpot 25 becomes zero and both sets of contacts 51 close due to the spring force of the upper leaf springs 45. The closed, series-connected contacts 51 complete a circuit to delay means for preventing the printing or recording of weighing scale data until a preset time has elapsed after the scale has come to rest, the rest condition being detected by the mechanical motion detector 32. Such delay means, for example, can be a motorized timer or a time delay relay which is in electrical circuit with the contacts 51. After the preset time has elapsed, the timer or the relay completes a circuit to a recording mechanism and printing or recording of weighing scale data takes place. Hence, premature operation of the recording mechanism is prevented.

When a load is applied to or removed from the scale, the tare beam lever 4 pivots about its fulcrum pivots 8. This causes the motion detector 32 carried by the lever 4 to move in an arc about the pivots 8 and the dashpot plunger 27 connected to the motion detector to move vertically. The damping force of the dashpot 25 tends to resist this motion and causes the actuating lever 31 of the motion detector to pivot about the axes of the cone pointed screws 37. Depending upon the direction of rotation of the tare beam lever 4, the actuating lever 31 will be pivoted against one or the other of the stop screws 40 and one or the other of the plungers 59 carried by the actuating lever 31 will bend back its respective upper leaf spring 45 and open one of the sets of normally closed contacts 51. One set of contacts 51 is held open while the dashpot plunger 27 moves up and the other set of contacts 51 is held open while the dashpot plunger moves down. This breaks the circuit preventing printing or data recording while the scale is moving. The net result is an open circuit, to prevent printing or data recording, during scale motion and a closed circuit, to allow printing or data recording, when the scale is at rest.

The embodiment of the invention herein shown and described is to be regarded as illustrative only, and it is to be understood that the invention is susceptible to variation, modification and change within the spirt and scope of the subjoined claims.

Having described the invention, I claim:

1. A measuring device comprising, in combination, a condition responsive member, a dashpot having a movable plunger and functioning to suppress continued oscillation of the member following sudden changes in said condition, and a motion detector carried by the member and connecting the dashpot plunger to the member, said motion detector including a pivotally mounted lever connected to the dashpot plunger, two sets of electrical contacts mounted adjacent the lever, the contacts being normally closed and connected in series in an electrical circuit, adjustable stop means for limiting travel of the lever relative to the contacts, the lever being pivoted against the stop means whenever the condition responsive member moves, and means operated by the lever for holding open one or the other of the sets of contacts whenever the lever is against the stop means, whereby there is an open circuit during motion of the condition responsive member and a closed circuit when the condition responsive member is at rest.

2. A motion detector for sensing motion of a condition responsive member comprising, in combination, a pivotally mounted actuating lever operatively connected to the condition responsive member, two sets of electrical contact means mounted adjacent the lever, each set of contact means including a pair of contacts, a first leaf spring for resiliently mounting one of the contacts of such pair and for urging such contact toward the other contact of the pair to a normally closed position, a second leaf spring for resiliently mounting said other contact, adjustment means operating in opposition to the second leaf spring for maintaining said other contact in an adjustable position which is retained even though the motion detector is subjected to vibration and additional adjustment means operating in opposition to the first leaf spring for adjusting the force with which the contacts are urged together when closed, the pairs of contacts being connected in series in an electrical circuit, stop means for limiting travel of the lever relative to the contact means, the lever being pivoted against the stop means whenever the condition responsive member moves, and means operated by the lever for holding open one or the other of the pairs of contacts in opposition to a leaf spring whenever the lever is against the stop means, whereby there is an open circuit during motion of the condition responsive member and a closed circuit when the condition responsive member is at rest.

3. A weighing scale comprising, in combination, a member mounted to move in response to changes in load, a dashpot that has a movable plunger and that functions to suppress continued oscillation of the member following sudden changes in load, and a motion detector carried by the member, connecting the dashpot plunger to the member and detecting scale motion by sensing motion of the dashpot plunger, said motion detector including a lever pivotally mounted on the member and operatively connected to the dashpot plunger, adjustable stop means carried by the member for limiting movement of the lever relative to the member, two sets of electrical contacts carried by the member adjacent the lever, resilient means carried by the member for urging the contacts toward normally closed positions, change in load causing movements of the member, motion detector and dashpot plunger, dashpot damping force resisting such movement of the plunger to pivot the lever operatively connected to the plunger against the stop means whenever and while the plunger moves, and means operated by the lever for holding open one or the other of the sets of contacts in opposition to the resilient means whenever the lever is against the stop means, the normally closed contacts closing when the plunger comes to rest, whereby scale motion is indicated by an open contact and the rest condition of the scale is indicated by the closure of both of the sets of normally closed contacts.

4. A weighing scale comprising, in combination, a member mounted to move in response to changes in load, a dashpot that has a movable plunger and that functions to suppress continued oscillation of the member following sudden changes in load, and a motion detector carried by the member, connecting the dashpot plunger to the member and detecting scale motion by sensing motion of the dashpot plunger, said motion detector including pivot means carried by the member and operatively connected to the dashpot plunger, stop means carried by the member for limiting movement of the pivot means relative to the member, resilient means carried by the member adjacent the pivot means, electrical contact means carried by the resilient means, the resilient means operating the contact means when the weighing scale is at rest, and means for adjusting the force with which the resilient means operates the contact means, change in load causing movements of the member, motion detector and dashpot plunger, the pivot means being pivoted against the stop means during such movements and operating the contact means in opposition to the resilient means whenever the pivot means is against the stop means.

5. A weighing scale comprising, in combination, a member mounted to move in response to changes in load, a dashpot that has a movable plunger and that functions to suppress continued oscillation of the member following sudden changes in load, and a motion detector carried by the member, connecting the dashpot plunger to the member and detecting scale motion by sensing motion of the dashpot plunger, said motion detector including a lever pivotally mounted on the member and operatively connected to the dashpot plunger, stop means carried by the member for limiting movement of the lever relative to the member, two sets of electrical contact means carried by the member adjacent the lever, each set of contact means including a pair of contacts, a leaf spring for resiliently mounting one of the contacts of such pair and for urging such contact toward the other contact of the pair to a normally closed position and adjustment means operatively connected to said other contact for maintaining said other contact in an adjustable position, the pairs of contacts being connected in series in an electrical circuit, change in load causing movements of the member, motion detector and dashpot plunger, dashpot damping force resisting such movement of the plunger to pivot the lever operatively connected to the plunger against the stop means whenever and while the plunger moves, and means on the lever for holding open one or the other of the pairs of contacts in opposition to a leaf spring whenever the lever is against the stop means, the normally closed contacts closing when the plunger comes to rest, whereby there is an open circuit during scale motion and a closed circuit when the scale is at rest.

6. A weighing scale comprising, in combination, a member mounted to move in response to changes in load, a dashpot that has a movable plunger and that functions to suppress continued oscillation of the member following sudden changes in load, and a motion detector which operatively connects the dashpot plunger to the member and which detects scale motion by sensing motion of the dashpot plunger, said motion detector including a lever mounted on the member to pivot about a fulcrum axis and operatively connected at one side of the axis to the dashpot plunger, stop means carried by the member for limiting movement of the lever relative to the member, two sets of electrical contact means carried by the member adjacent the lever, each set of contact means including a pair of contacts, a pair of leaf springs for resiliently mounting the contacts in normally closed position and means for adjusting the force with which the contacts are urged together when closed, the pairs of contacts being connected in series in an electrical circuit, the contact means being so oriented that a pair of contacts is located one on either side of the fulcrum axis, change in load causing movements of the member, motion detector and dashpot plunger, dashpot damping force resisting such movement of the plunger to pivot the lever operatively connected to the plunger against the stop means whenever and while the plunger moves, and a pair of contact operators on the lever, one operator on either side of the fulcrum axis for holding open one or the other of the pairs of contacts whenever the lever is against the stop means, the normally closed contacts closing when the plunger comes to rest, whereby there is an open circuit during scale motion and a closed circuit when the scale is at rest.

References Cited in the file of this patent

UNITED STATES PATENTS

| | | |
|---|---|---|
| 1,533,101 | Crane | Apr. 14, 1925 |
| 2,036,014 | Burger | Mar. 31, 1936 |
| 2,083,362 | Bryce | June 8, 1937 |
| 2,878,334 | Aller | Mar. 17, 1959 |

FOREIGN PATENTS

| | | |
|---|---|---|
| 142,864 | Austria | Sept. 25, 1935 |
| 155,280 | Sweden | July 17, 1956 |